Figure 1:
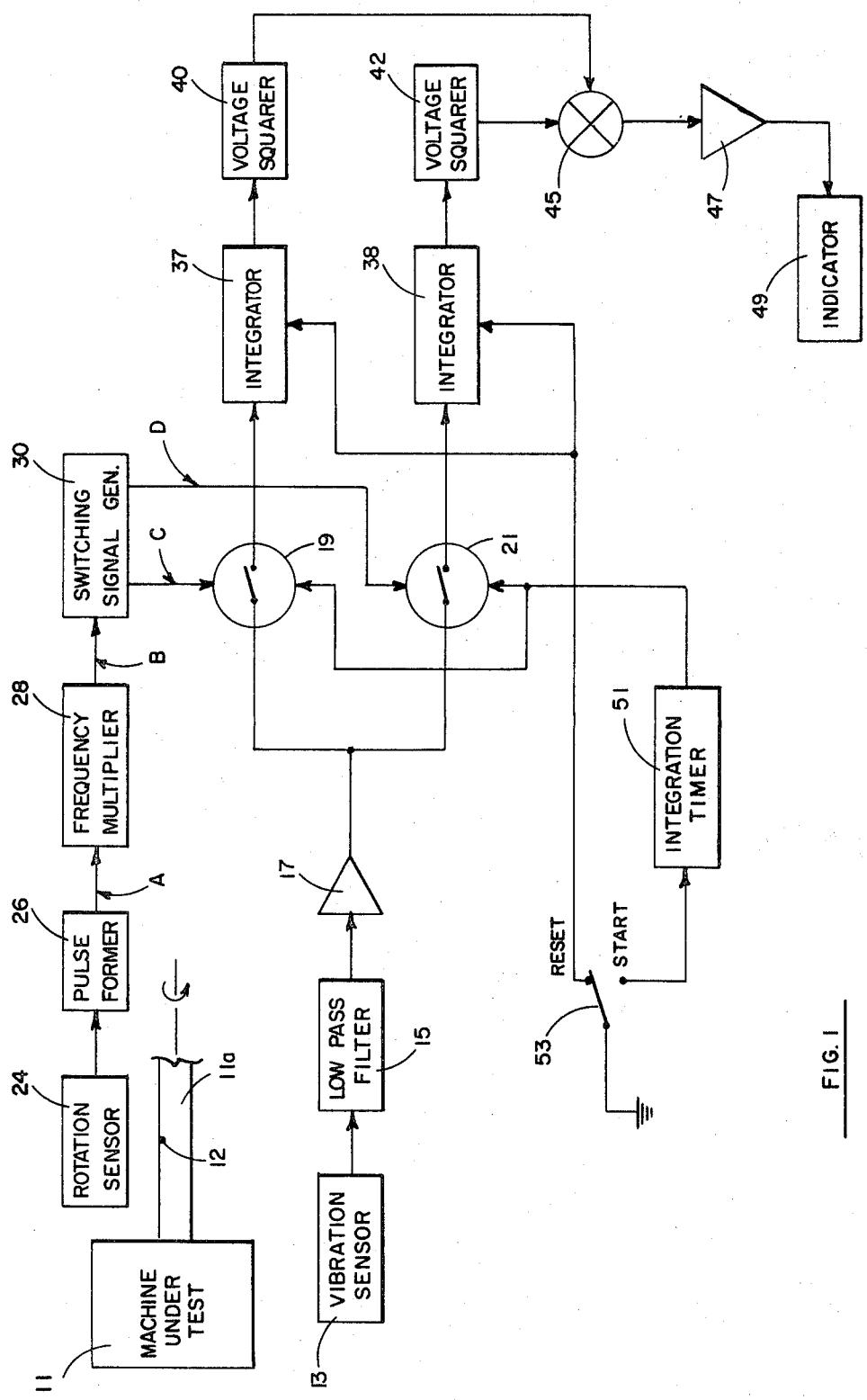

United States Patent
Rennick

[11] 3,733,892
[45] May 22, 1973

[54] SYNCHRONOUS VIBRATIONAL ANALYZER FOR ROTATING MACHINERY

[75] Inventor: Lyle Vance Rennick, Mission Viejo, Calif.

[73] Assignee: Northrop Corporation, Los Angeles, Calif.

[22] Filed: Apr. 3, 1972

[21] Appl. No.: 240,617

[52] U.S. Cl..................................73/71.4, 73/67.2
[51] Int. Cl..............................................G01n 29/00
[58] Field of Search.....................73/71.4, 67, 67.2

[56] References Cited
UNITED STATES PATENTS
3,277,695  10/1966  Joline....................................73/71.4

Primary Examiner—Richard C. Queisser
Assistant Examiner—Arthur E. Korkosz
Attorney—Edward A. Sokolski et al.

[57] ABSTRACT

A pulse signal is generated which is a precise multiple of the rotation frequency of a machine to be tested. A sensor is utilized to generate an electrical signal in accordance with vibration developed in the machine with its rotation. Low frequency components of this signal are filtered out therefrom and these filtered signals fed to a pair of switching circuits. The pulse signals in accordance with the rotation of the machine are fed to a switching signal generator where quadrature related signals synchronized with the machine rotation are developed. These quadrature related signals are fed to the switching circuits as the switching control therefor, so as to provide samplings of the vibration signals in quadrature relationship. The outputs of the switching circuits are each integrated and squared, the squared signals then being summed. These summed output signals are then fed to an indicator which provides the indication of the amplitude of vibrational components at the machine rotation frequency or a harmonic thereof.

8 Claims, 3 Drawing Figures

SYNCHRONOUS VIBRATIONAL ANALYZER FOR ROTATING MACHINERY

This invention relates to a system for analyzing the performance of rotating machinery, and more particularly to such a system in which such analysis is made by synchronously measuring the amplitude of vibrational components at the fundamental and harmonics of the machine rotation frequency.

In the analysis of the performance characteristics of rotating machinery, techniques have been developed which involve measurement of the vibrational output of the machinery under test and comparing this with the output of a model equipment. Generally, in this analysis the vibrational outputs over a predetermined frequency spectrum are observed on a spectrum analyzer, and this spectral picture compared with that of a model. Using this technique, after much experimentation it can be found that certain faults in a particular machinery design have particular spectrum "signatures" which can be detected by means of electrical filters. A diagnostic system can then be constructed using particular filters for extracting the vibrational components of interest in determining the amplitude of these vibrational components against reference amplitudes to determine the existence of various faults. Using this approach of the prior art, it is essential that the speed of rotation of the machinery be accurately controlled in view of the fact that the vibrational output will vary as a function of the rotation speed. Further, utilizing a fixed set of filters generally constrains the use of the equipment to a particular machinery configuration and thus hampers the versatility of the system.

The system of this invention provides means for measuring the vibrational outputs of a machine which are harmonically related to the machine rotation speed and in which the frequency of vibration being measured is automatically synchronized with the machine rotation. Further, in view of the fact that the vibrational components being measured are automatically maintained in harmonic relationship to the machine rotation speed, the system can be utilized with a whole variety of machine configurations and need not be specially designed for each particular machine. The system of this invention, while capable of providing highly accurate measurements of vibrational components of interest, is nevertheless relatively simple in its design and of relatively economical construction.

It is therefore an object of this invention to facilitate the analysis of the performance of rotating machinery.

It is a further object of this invention to provide a system for analyzing the performance of rotating machinery which self-adapts its vibration measurements to the frequency of rotation of the machinery.

It is still another object of this invention to provide a machine vibration analyzer having improved versatility of utilization over prior art devices of this type.

Figure 2:
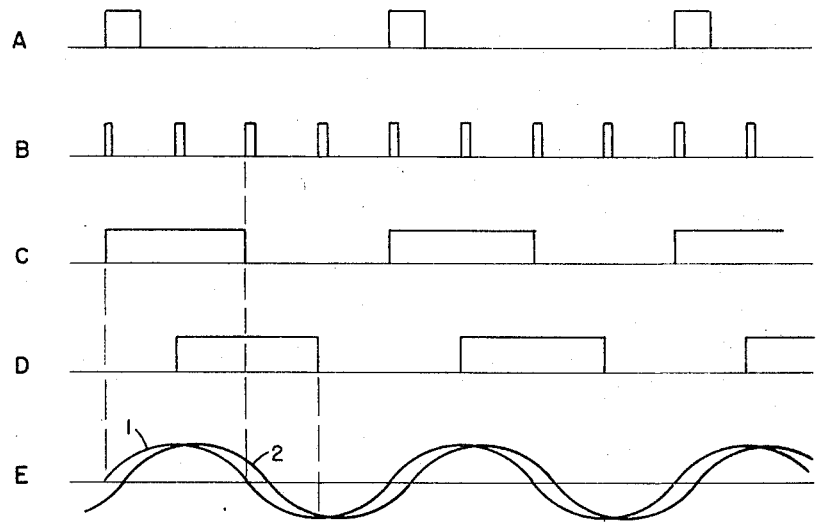
Figure 3:
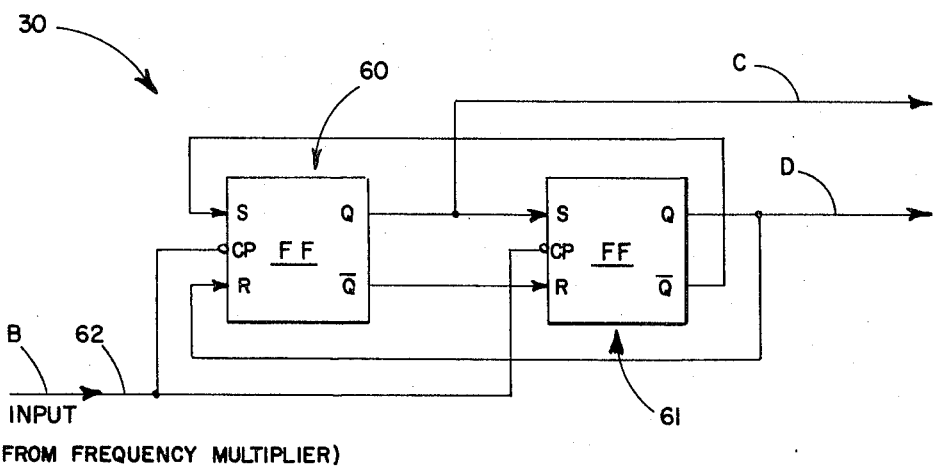

Other objects of this invention will become apparent as the description proceeds in connection with the accompanying drawings, of which:

FIG. 1 is a functional block diagram illustrating a preferred embodiment of the invention, FIG. 2 is an illustration of various waveforms which may be developed in the embodiment of FIG. 1, and FIG. 3 is a functional schematic illustrating a switching signal generator which may be utilized in the system of the invention.

Briefly described, the system of the invention includes a vibration sensor for generating an electrical signal in accordance with the vibration of a rotating machine under test. Low frequency components of this vibration signal are filtered out and the filtered signal fed to a pair of switching circuits. The switching signal for each of these switching circuits is provided from a switching signal generator, the switching signals to the two switching circuits being in quadrature relationship. An electrical signal is generated in accordance with the rotation frequency of the machine under test, the switching signal generator, and thus the switching signal to each of the switching circuits being synchronized with the output of the rotation sensor or a precise multiple of the frequency thereof. The outputs of each of the switching circuits are separately integrated and squared, the two squared signals being added together in a summing device. The output of the summing device, which represents the magnitude of the vectorial component resulting from the vector addition of the quadrature related signals, is fed to an indicator, the indicated signal representing the amplitude of a machine vibrational component of interest.

Referring now to FIGS. 1 and 2, a preferred embodiment of the system of the invention and waveforms generated thereby are respectively illustrated. The vibration of machine 11 under test is sensed by means of vibration sensor 13, which may comprise an accelerometer mounted on the machine. The electrical output of vibration sensor 13 is fed to low pass filter 15 which filters out all high frequency components, leaving only the fundamental frequency and low order harmonics of interest (typically the fundamental and second harmonic). The output of low-pass filter 15 is amplified by means of amplifier 17 to improve the signal to noise ratio, the output of amplifier 17 being fed to each of switching circuits 19 and 21. Switching circuits 19 and 21 may comprise electronic gating circuits or conventional switches.

Rotation sensor 24 is positioned in proximity to the output shaft 11a of the machine and provides a pulse output signal for each shaft rotation. Rotation sensor 24 may comprise a photoelectric sensor which operates in conjunction with a light reflecting marker 12 on shaft 11a, or may comprise a magnetic sensor with marker 12 comprising a groove in the shaft which provides a signal to the sensor with each shaft rotation by virtue of the change in magnetic field produced thereby. The output of rotation sensor 24 is fed to pulse former 26, which squares and shapes the output of the sensor to provide a signal as indicated in Line A of FIG. 2. The output of pulse former 26 is fed to frequency multiplier 28 which multiplies the pulse signal by a predetermined factor. In the illustrative example, as shown in Line B of FIG. 2, this multiplication factor is 4, this particular factor being used for analyzing vibrational components in synchronism with the fundamental rotation frequency of the machine. For analyzing vibration in synchronism with twice the rotating frequency, the multiplication factor would be 8, for analyzing third harmonic components, 12, etc.

The output of frequency multiplier 28 is fed to switching signal generator 30. From these signals the switching signal generator develops a pair of quadrature related switching signals (shown in FIG. 2 at Lines C and D) these signals for the illustrative example being at the fundamental rotation frequency of the machine. Switching signal generator 30 may comprise logical gating circuits operating in conjunction with flipflops as shown in FIG. 3 and described further on in the specification. Each output of switching signal generator 30 is used as a switching signal for a separate one of switching circuits 19 and 21, and thus acts to gate the output of amplifier 17 through each of these switches during the time intervals that the switching signals such as shown on Lines C and D of FIG. 2 are present. The signals are fed from switches 19 and 21 to integrators 37 and 38 respectively, where they are each integrated and fed to a separate voltage squarer circuit 40 and 42 respectively.

The outputs of voltage squarers 40 and 42 are fed to summing device 45 where they are added together, the output of the summing device being fed to amplifier 47 which appropriately scales and amplifies the summed output. The output of amplifier 47 is fed to indicator 49 which may comprise a voltmeter providing an indication of the amplitude of the vibrational component being measured. The time during which the integration of the signals occurs is controlled by means of integration timer 51 which operates to inhibit the closing of switches 19 and 21 a predetermined time after switch 62 has been thrown to the "start" position. Prior to each measurement, switch 53 is thrown to the "reset" position to reset the integrators to zero.

Referring now to FIG. 3, a switching signal generator which may be utilized in the system of the invention is schematically illustrated. The circuit consists of two flipflops connected in a "twisted loop". Additionally referring to FIG. 2, the circuit operates as follows: Assume both flipflops to initially be in a reset state, i.e. with both outputs FALSE and with the signals on lines C and D of FIG. 2 at "zero". The next pulse to arrive on line 62 will cause flipflop 60 to set causing its output to go TRUE. This pulse has no effect on flipflop 61, its output remaining FALSE. The next pulse on line 62 causes no change in the state of flipflop 60 but causes flipflop 61 to set, its output going TRUE. The following pulse on line 62 causes flipflop 60 to reset (in view of the TRUE input provided to its reset terminal from the output of flipflop 61) but causes no change in the state of flipflop 61. To complete the cycle, the next pulse on line 62 causes flipflop 61 to reset, returning the circuit to its original state.

Referring now to Line E of FIG. 2, the wave form labeled 1 represents a vibrational component at the fundamental of the machine rotation frequency, which is in phase with the pulse output of pulse former 26 (shown on Line A of FIG. 2). For such a vibrational component, it can be seen that integrator 37 will have a positive output in view of the fact that the switching signal (shown on Line C) occurs only during the positive excursions of the vibration input signal. Integrator 38, on the other hand, will have a zero output in view of the fact that the switching signal fed to switch 21 occurs during equal positive and negative excursions of the signal.

For the waveform 2 of Line E, each of the integrators will have an output representing the difference in each case between the area under the positive and negative excursions of the waveform. Summing device 45 will provide an output in accordance with the amplitude of the vector sum of the two integrator outputs, which accurately indicates the amplitude of the vibrational component. Thus, by using the two quadrature related switching signals, we always get a resultant representing the amplitude of the vibrational component regardless of its phase relationship to the machine rotation. It should be readily apparent that any vibrational energy that is not in synchronism with the switching of switches 19 and 21 and thus is not at the fundamental rotation frequency of the machine under test will be sampled during positive excursions as often as during negative excursions, and thus will integrate out to zero regardless of its magnitude. It also should be apparent that the system can be made sensitive to harmonic frequencies of the machine rotation by changing the multiplying factor of frequency multiplier 28. Thus, for measuring the second harmonic components, the multiplication factor of the multiplier should be doubled to produce 8 pulses for each machine rotation, etc. It is further to be noted that the effective bandwidth of the system is inversely related to the integration time provided by means of integration timer 51. Thus, the analysis bandwidth can be decreased and the signal to noise ratio increased by increasing the integration time.

The system of this invention thus provides a simple yet highly effective means for accurately measuring vibrational components of a piece of rotating machinery such as an engine or the like, wherein the vibrational components of interest are accurately identified.

While the system of this invention has been described and illustrated in detail it is to be clearly understood that this is intended by way of illustration and example only and is not to be taken by way of limitation, the spirit and scope of this invention being limited only by the terms of the following claims:

I claim:

1. In a system for measuring the amplitude of vibrational energy developed in a machine at a frequency having a predetermined harmonic relationship to the rotation frequency of the machine, comprising:
   means for generating a pulse signal in accordance with the rotation frequency of the machine,
   means for generating an electrical signal in accordance with the vibration of the machine during rotation thereof, said electrical signal including the vibrational energy to be measured,
   frequency multiplier means for multiplying the pulse signal by a factor in accordance with the harmonic relationship between the component to be measured and the machine rotation frequency,
   switching signal generator means responsive to the multiplied pulse signal for generating quadrature related signals at the frequency of the signal component to be measured,
   separate switching circuit means, each for receiving one of said quadrature related signals as a switching control signal therefor, said switching circuit means both receiving the electrical signal in accordance with machine vibration,
   means for integrating the outputs of each of said switching circuit means,
   means for squaring the outputs of each of said integrating means,
   means for summing the outputs of said squaring means, and
   means for indicating the output of said summing means.

2. The system of claim 1 wherein said component to be measured is at the rotation frequency of the machine, the multiplication factor of said multiplying means being 4.

3. The system of claim 1 and further including integration timer means for controlling the time intervals during which the signals are integrated by said integrator means.

4. The system of claim 1 and further including a low pass filter for passing only components in the vibration signal which are no greater in frequency than that of the second harmonic of the rotation frequency of the machine.

5. A system for measuring the magnitude of a vibration component of the vibrational energy generated by a rotating machine, said component having a frequency harmonically related to the rotation frequency of said machine, comprising:

means for generating a pulse signal in accordance with the rotating frequency of the machine, means responsive to said pulse signal for generating a pair of quadrature related signals at the frequency of machine rotation, means for generating an electrical signal representing the vibrational energy developed by said machine during its rotation, separate switch means, each responsive to a separate one of said quadrature related signals for switching the electrical signal representing the vibrational energy, means for integrating the outputs of each of said switching means, means for squaring the output of each of said integrator means, means for summing the outputs of said squaring means, and indicator means for receiving the output of said summing means and providing an indication of the magnitude thereof, whereby vibrational energy other than at the frequency of said vibration component is effectively zeroed out in said integrator means.

6. The system of claim 5 and further including integration timer means for controlling the time duration of said integration.

7. The system of claim 5 wherein said means for generating a pulse signal comprises means for generating a pulse output at the rotation frequency, and frequency multiplier means for multiplying the pulse output by a factor in accordance with the harmonic relationship between the component to be measured and the machine rotation frequency.

8. The system of claim 7 wherein said frequency component to be measured is at the frequency of the rotation of said machine, the multiplication factor of said frequency multiplier means being 4.

* * * * *